INVENTOR.
FRED H. JENSEN

BY
Robert W. Beach
ATTORNEY

INVENTOR.
FRED H. JENSEN

BY
Robert W. Beach

ATTORNEY

Dec. 9, 1969 F. H. JENSEN 3,483,391

SPIRAL ELEMENT ROTARY-SENSING MECHANISM

Filed Jan. 23, 1969 8 Sheets-Sheet 3

INVENTOR.
FRED H. JENSEN

BY Robert W. Beach

ATTORNEY

SPIRAL ELEMENT ROTARY-SENSING MECHANISM

Filed Jan. 23, 1969 8 Sheets-Sheet 4

INVENTOR
FRED H. JENSEN
BY
Robert W. Beach
ATTORNEY

SPIRAL ELEMENT ROTARY-SENSING MECHANISM

Filed Jan. 23, 1969 8 Sheets-Sheet 5

INVENTOR
FRED H. JENSEN
BY
Albert W. Beach
ATTORNEY

INVENTOR:
FRED. H. JENSEN
BY Robert W. Beach
ATTORNEY

INVENTOR:
FRED H. JENSEN
BY Robert W. Beach
ATTORNEY

SPIRAL ELEMENT ROTARY-SENSING MECHANISM

Filed Jan. 23, 1969

8 Sheets-Sheet 8

INVENTOR:
FRED H. JENSEN
BY Robert W. Beach
ATTORNEY

United States Patent Office
3,483,391
Patented Dec. 9, 1969

3,483,391
SPIRAL ELEMENT ROTARY-SENSING MECHANISM

Fred H. Jensen, 3418 77th Place SE., Mercer Island, Wash. 98040

Continuation-in-part of application Ser. No. 720,287, Apr. 10, 1968. This application Jan. 23, 1969, Ser. No. 793,345
Int. Cl. G01d 5/34
U.S. Cl. 250—231 24 Claims

ABSTRACT OF THE DISCLOSURE

A rotor in the form of a disk or a cylinder has on it a spiral. In one form of device such spiral is a slot capable of transmitting light from a light source on one side of the rotor to a photoelectric cell on the other side of the rotor. The spiral slot can be continuors or can be composed of several sections with the adjacent ends of adjacent sections being offset. A shutter is provided for the photoelectric cell which can be adjusted relative to the slot so that the photoelectric cell will receive light from the light source for energization upon relative rotation of the photoelectric cell and rotor to bring one end of a track section into coincidence with the photoelectric cell. Alternatively, two shutters can be provided for a photoelectric cell which can be moved independently to vary the size of the opening through which light can reach the cell. In another form of device the spiral shields a light source on one side of the rotor from a photoelectric cell on the other side of the rotor. In other forms, spiral conducting strips are used in place of a light-transmitting spiral slot and such strips are engaged by electrically conducting fingers. Such fingers may be moved intermittently into and out of contact with the strips so as to minimize resistance to rotation of the rotor by contact of the fingers with the strips.

This application is a continuation-in-part of U.S. patent application Ser. No. 720,287, for Spiral Track Rotary-Sensing Mechanism, filed Apr. 10, 1968, now abandoned, which is a division of patent application Ser. No. 343,988 for Spiral Track Rotary-Sensing Mechanism, filed Feb. 11, 1964, now abandoned, which is a continuation-in-part of patent application Ser. No. 179,406, filed Mar. 13, 1962, for Matched Sensing and Receiving Devices, now abandoned.

Sensing devices of the present invention will sense a particular phenomenon and, as a result, will energize a receiving device which may be at a remote location. Such receiving device will be actuated by the sensing device such as to indicate the phenomenon sensed by the sensing device, to record the value of such phenomenon activating the sensing device, or to respond to such value of the phenomenon by energizing an actuator having a relationship to such phenomenon, for example. The sensing device to which this invention relates in particular is of the spiral rotary type.

It is an object of the present invention to provide sensing mechanism which can be adjusted easily to correspond to different values of a phenomenon to be sensed, and which will effect corresponding indication or control in response to the particular adjustment of the sensing device. A related object is to enable such adjustment to be made over a wide range of values of the phenomenon.

A principal object of this invention is to enable a sensor to be positioned in different circumferential locations around the circular path of an indicator when the rotative range of such indicator exceeds 180°. It is a particular object to provide mechanism which will enable such sensor, when located in any position adjusted circumferentially around the path of the indicator, to respond differently when the indicator is at one side of the sensor than when the indicator is at the other side of the sensor without dependence on memory devices; that is, the sensor "knows" at all times whether the indicator is "up-scale" or "down-scale" from the sensor.

A further object is to provide such a sensing device which is very sensitive and accurate in operation and which will not interfere appreciably with the movement of an indicator. Such sensor is, however, quite durable, rugged and reliable, without requiring substantial maintenance.

Another object is to provide a device which can be economically adapted to a wide variety of uses.

An important advantage of the present invention is to provide sensing devices which will accomplish the objects stated above while being of comparatively simple, inexpensive and light construction.

As a representative application of the mechanism of the present invention, the sensing device may, for example, be associated with a temperature-sensitive element so as to sense the phenomenon of temperature; and the receiving device may afford an indication of a selected temperature at a remote location, or the receiving device could perform a control function related to the temperature sensed, such as to control a supply of fuel, whether gas or oil or electricity, to a heating device for the purpose of increasing or decreasing the supply of such fuel to maintain a desired constant temperature. The sensing device could sense fluid pressure, such as the liquid pressure at the bottom of a storage tank corresponding to the depth of liquid in the tank, or gas pressure such as that being accumulated in a gas storage receptacle; and the receiving device connected to the sensing device could afford an indication of such liquid pressure or depth, or of such gas pressure, or could energize an actuator for the purpose of closing a gas supply line.

Such a sensing device may effect energization or deenergization of an electric circuit corresponding to one or more particular values of a phenomenon sensed, such as particular positions of an electric meter.

Figures 12, 13, 14, 15:
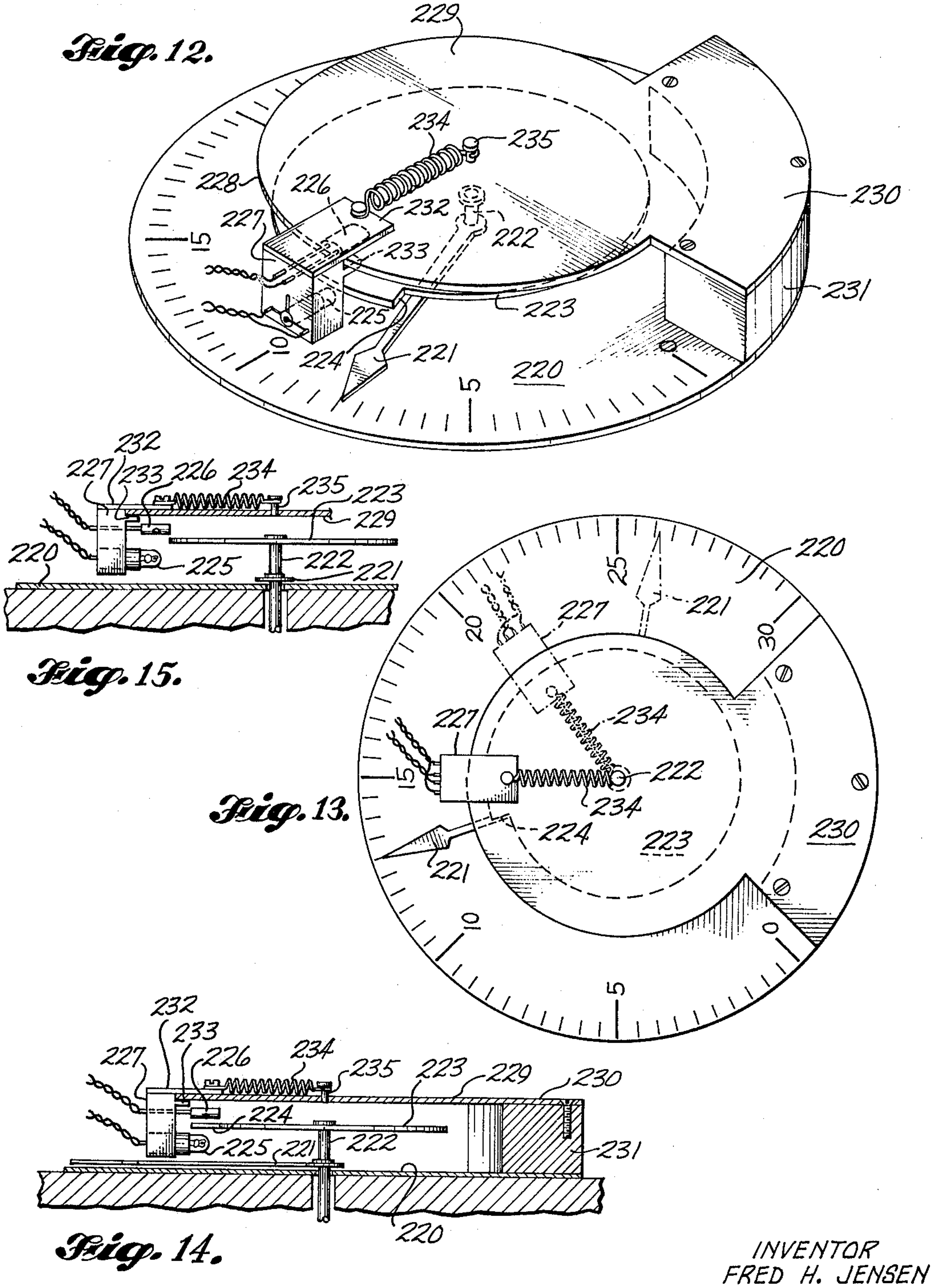

FIGURE 12 is a top perspective of a modified type of sensing device embodying a rotor disk having a spiral periphery; FIGURE 13 is a plan of such device; and FIGURE 14 is a vertical diametral section through that device. FIGURE 15 is a vertical diametral section through the same device with parts being broken away and other parts in a different operating position.

Figures 16, 17, 18:
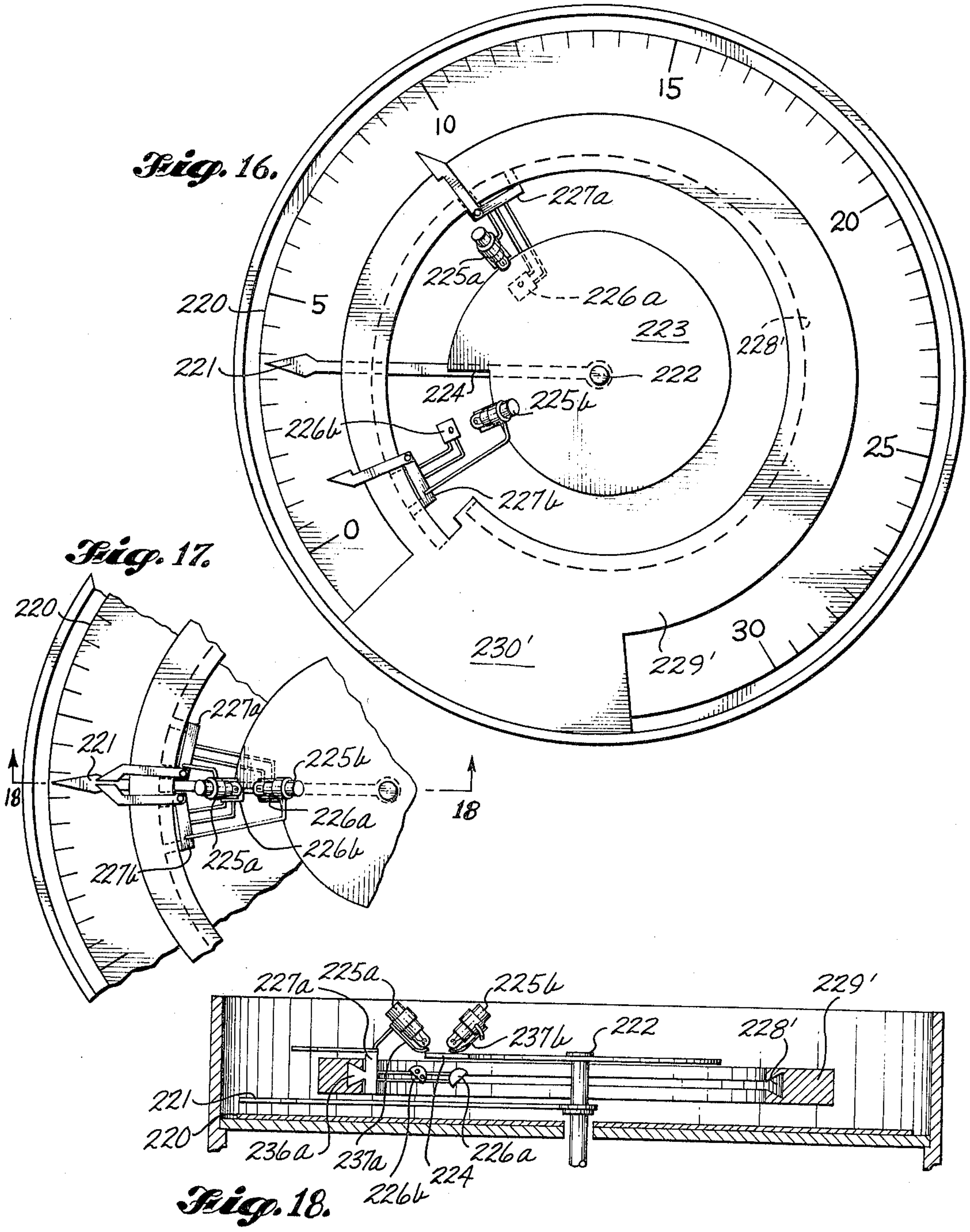
Figures 19, 20, 21:
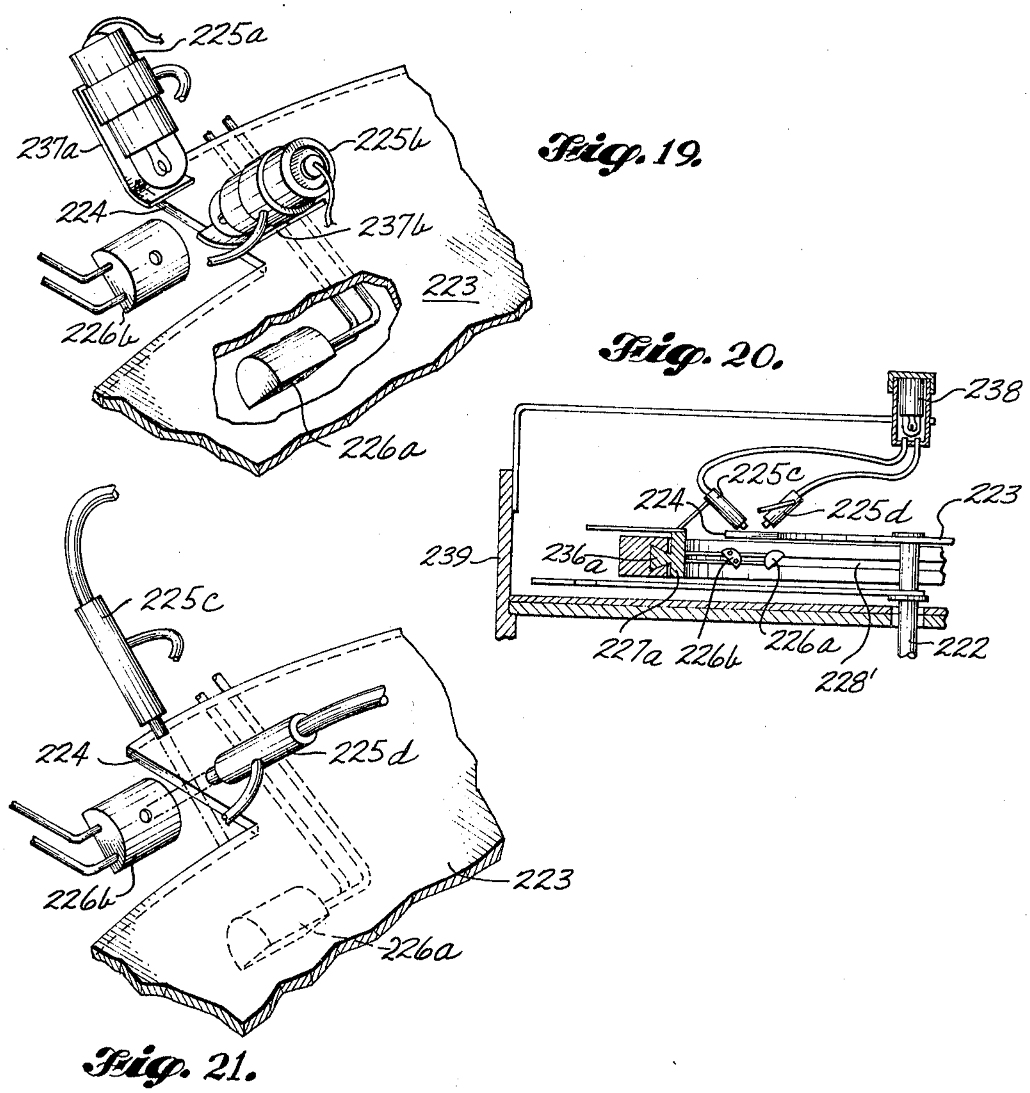

FIGURE 16 is a plan of still a different type of device and FIGURE 17 is a fragmentary plan of such device with parts being in different adjusted positions. FIGURE 18 is a vertical section through the device taken on line 18—18 of FIGURE 17. FIGURE 19 is a detail top perspective of a portion of the device shown in FIGURES 10, 17 and 18.

FIGURE 20 is a vertical section through a portion of a device somewhat similar to that shown in FIGURES 16, 17, 18 and 19; and FIGURE 21 is a fragmentary top perspective of a portion of the device corresponding to the portion of the different device shown in FIGURE 19 and illustrating the difference in the features of the two devices of FIGURES 16 and 20.

Figures 22, 23, 24:
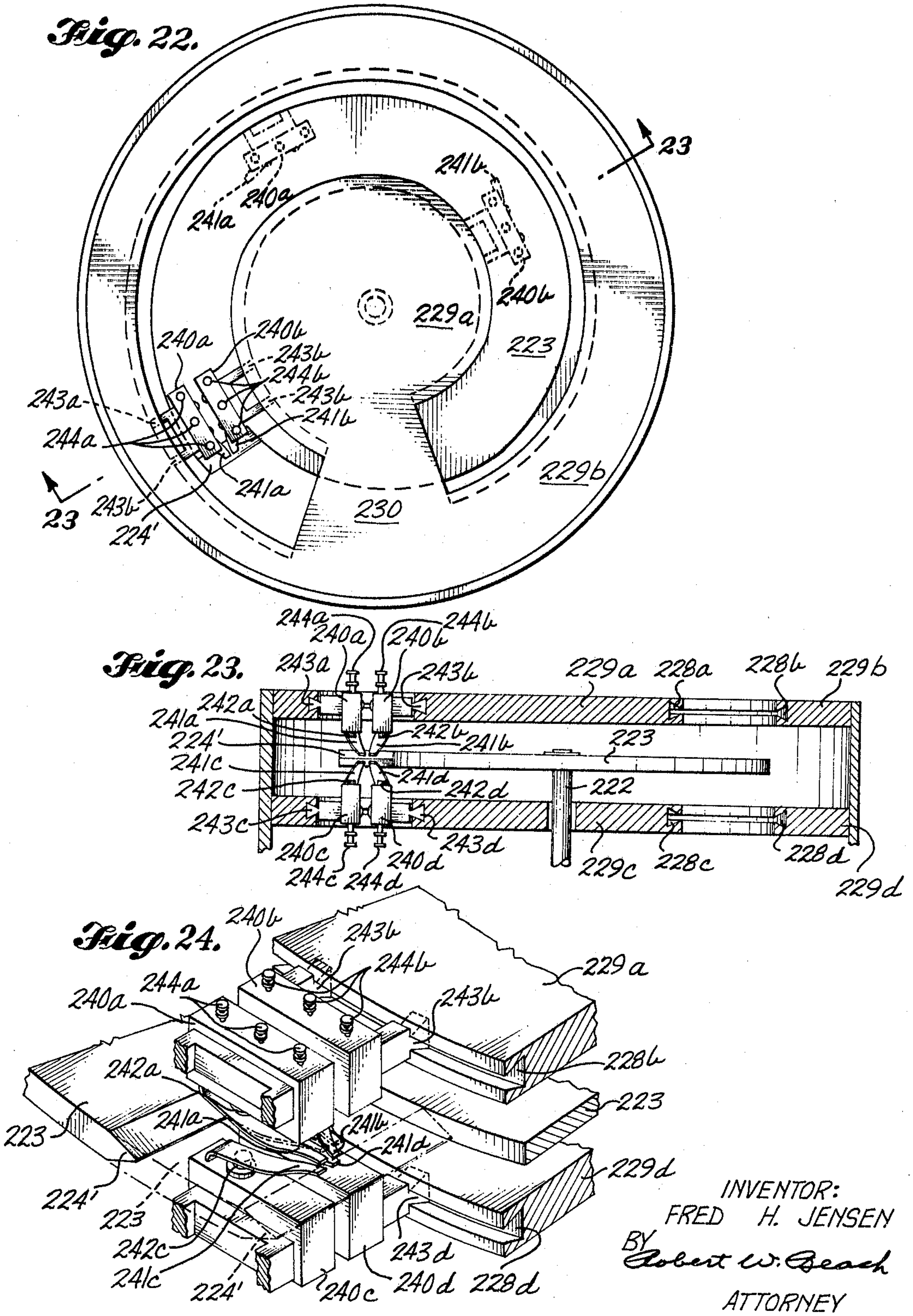

FIGURE 22 is a plan of still another form of device and FIGURE 23 is a diametral vertical section through the device taken on line 23—23 of FIGURE 22. FIGURE 24 is a fragmentary detail top perspective of a portion of the device shown in FIGURES 22 and 23.

A common characteristic of all the sensing devices of the present invention is the utilization of a spiral control element on a rotor to effect energization of one or more spiral-element-controlled elements. The spiral control element may be of the planar spiral type, such as being provided on a type of rotor disk, or of the helical spiral type, such as being provided on a cylindrical rotor. Also, the control element may be of the continuous spiral type or of the stepped sectional type. A planar spiral control element may thus be composed of arcaute sections, each section of which is a circular arc, the radii of which sections are progressively longer from one end of the spiral to the other. A stepped sectional helical spiral is composed of arcuate sections all having the same radius, but which sections are progressively offset axially from one end of the spiral to the other.

The type of control element and cooperating controlled elements may also differ for each type of spiral specified above. Thus, the spiral control elements could be an electrically conductive track either with or without mechanical engagement characteristics. A finger in an electrical circuit could, for example, engage a printed conductive circuit path, or such an electrically conductive path could influence an electromagnetically sensitive element in proximity to it. Alternatively, the spiral control element could effect control of a controlled element by light, such as by the spiral element being a spiral edge of an opaque disk or a narrow spiral slot or translucent spiral band in an opaque rotatable element, and the element controlled by the spiral control element could include a light source at one side of the light-transmitting band and a light-sensitive cell at the opposite side of such band which can be activated by light transmited through such band from the light source.

The control function can be accomplished by various types of controlled elements and arrangements. Thus, for example, a single controlled element could be energized by registry with a portion of a control band of substantial length and de-energized when not in registry with any portion of the band. Alternatively, one controlled element could be arranged to energize an electric control circuit by relative movement into or out of registry with a portion of the band and a second controlled element could effect de-energization of such control circuit by movement into or out of registry with a portion of the same, or a portion of a conjointly operated band. Two such controlled elements could cooperate with separate controlling bands, or two such elements could cooperate with a single band. In either case such a controlled element or elements can be adjustable to respond to a relationship or relationships to different portions of a controlling band.

Figures 1, 2, 3:
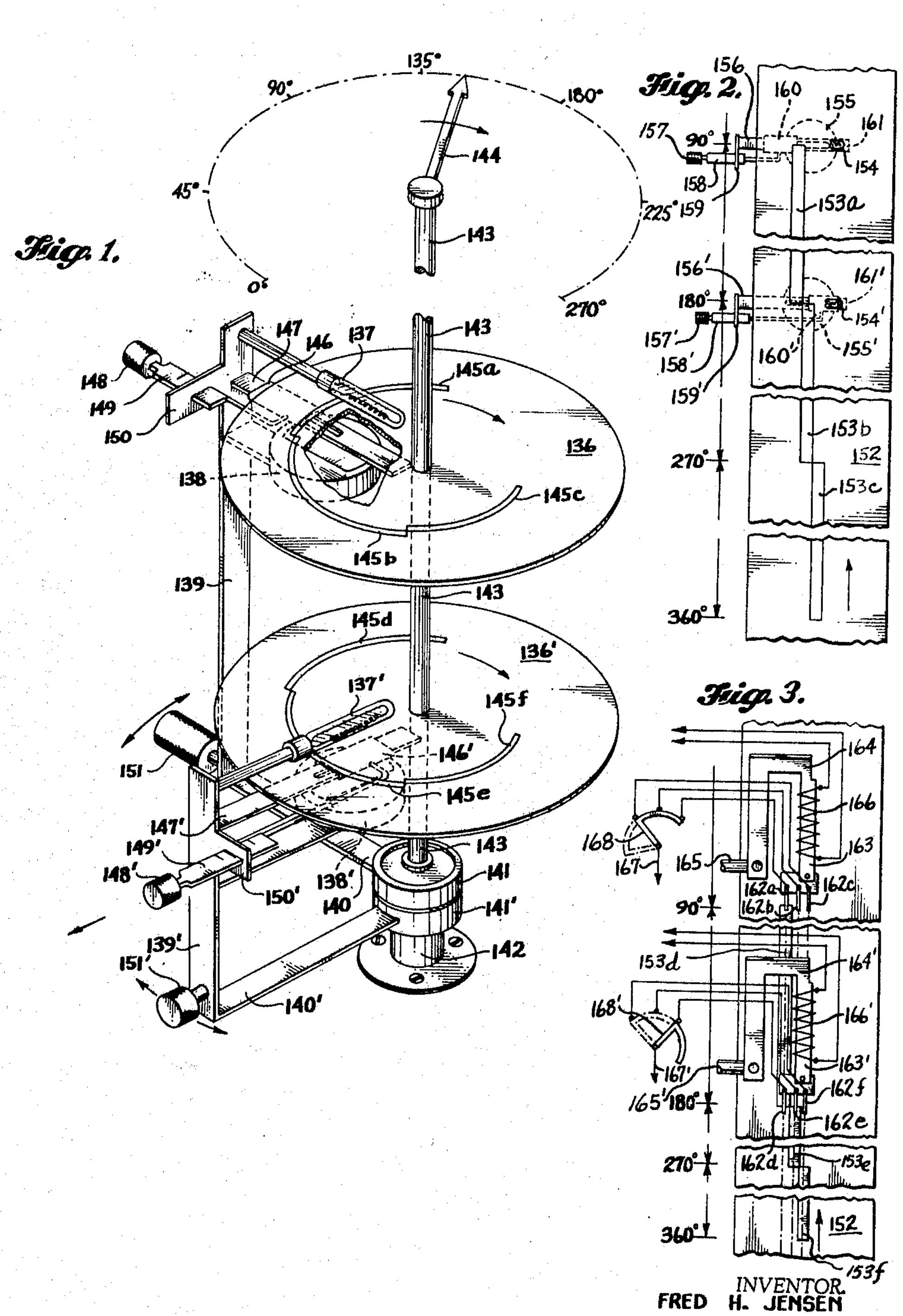
FIGURE 1 is a top perspective of a sensing device having two planar, stepped, light-transmitting, spiral bands, each band having one track-controlled element, with parts broken away.
FIGURE 2 is a developed view of a helical spiral, light-sensing mechanism having parts broken away
FIGURE 3 is a similar view of electrical-contact sensing mechanism.

The mechanism shown in FIGURE 1 includes rotors in the form of disks 136 and 136′ which are opaque and have inwardly of their peripheries light-transmitting spiral elements in the form of slots or of translucent, and preferably transparent, bands. Elements controlled by the spiral elements are in the form of light-sensitive devices so that there is no physical contact with the disks 136 and 136′ at all. The spiral control elements are shown as being of the stepped, arcuate, sectional type, instead of being of the continuously-varying radius type, and the cooperating controlled elements are adjustable both radially and circumferentialy in connection with such stepped spiral control elements. For convenience of construction two disks 136 and 136′ having identical spiral elements are utilized, one to effect an "on" control function and the other to effect an "off" control function.

In this figure only the sensing portion of the control or indicating mechanism is shown. It will be understood that such control mechanism could be connected to amplifiers or other suitable signal apparatus. The signal-producing devices are of the photosensitive type activated by a light source. Thus, a light 137 at one side of the disk 136 and a photoelectric cell 138 at the opposite side of the disk are carried by a supporting post 139. This post is mounted on the end of an arm 140 projecting radially outward from a rotative support 141 which is angularly adjustable around the axis of a standard 142 in which the shaft 143 carrying disks 136 and 136′ is journaled. This shaft also carries a pointer 144 which indicates the rotative position of such shaft and disks.

The light 137, as shown in FIGURE 1, is preferably elongated and supported so that its length extends transversely of the spiral control band on disk 136. Since such band extends circumferentially of the disk, the length of light 137 will extend radially of the disk and should be of a sufficient length so that some part of it will be in registry with each part of the spiral band as the disk 136 rotates. As mentioned above, it is preferred that the spiral of this band be of stepped configuration formed of arcuate sections with successive sections offset radially. While such a band could be formed by arcuate sections of different angular extent, the band is shown as being composed of three arcuate sections, each 90° in extent and arranged end to end so that the total arcuate extent of the spiral is 270°. The band includes a 90° circular arcuate section **145*a* of largest radius at one end, a central circular arcuate section 145*b* of intermediate radius, which is 90° in extent, and an opposite end circular arcuate section 145*c*** of smallest radius.

The photoelectric cell 138 at the side of disk 136 opposite the light 137 preferably is masked except for a short section extending transversely of the spiral and radially of the disk 136, so as to be sensitive only to concentrated light from the light source 137 passing through the spiral light-transmitting band **145*a*, 145*b* and 145*c*. In addition, it is desirable for such photoelectric cell to be energized or activated by light passing through only one section of such spiral band, although the photoelectric cell may continue to be activated by light passing through other sections of the spiral band. The controlling or signalling function will be accomplished by initiation of activation of the cell. Consequently, control means are provided for selecting the particular relative location of the post 139 and the spiral band 145*a*, 145*b*, 145*c*** at the time activation of the photoelectric cell is initiated.

The angular relationship of the disk 136 and the activation-initiating position of the photoelectric cell is established by positioning a photoelectric-cell-obscuring shutter 146 in the desired relationship to the disk 136. Such shutter is mounted for radial adjustment along a slotted bar 147 extending radially between the light source 137 and the photoelectric cell 138. Such adjustment of this shutter can be effected by grasping a knob 148 on the end of the slide 149 which is slidably received in a slot in the guide 150 and is attached to the shutter. Such slide has three principal positions indicated by index marks which correspond to the degree of offset between adjacent sections 145*a*, 145*b* and 145*c* of the spiral control band.

In addition, the shutter 146 is circumferentially adjustable around the axis of disk-supporting shaft 143 to an extent equal to the arcuate length of each spiral section, namely, 90°. Such angular adjustment can be effected easily by grasping the knob 151 which is attached to the post 139 for swinging it, arm 140 and the bearing member 141. If desired, a suitable reference member and index marks can be provided to indicate the particular angular position in which the post is located. Such cooperating stepped-spiral band and band-controlled element arrangement forms an inherently accurate and high resolution system with minimum requirement for precision construction because the activation of the photoelectric cell is initiated by arcute movement of the end of a band segment into registry with the exposed portion of the slot in bar 147. Such relative movement of the spiral band and the band-controlled photoelectric cell is accomplished by circumferential movement of the control band 145*a*, 145*b*, 145*c* effected by rotation of shaft 143, which carries the disk, relative to the shaft support 142, as indicated by swinging of the pointer 144. It will be evident that the action of effecting a control operation by such mechanism does not produce the slightest interference with rotation of the shaft 143 and the disks 136 and 136′ because there is no contact between the rotating mechanism and the sensor except through the bearing member 141.

As arranged in FIGURE 1, activation of the control mechanism would occur in response to light-receiving activation of the photoelectric cell 138. The shutter 146 can therefore be adjusted radially along the slotted bar 147 so that such photoelectric cell activation would occur earlier or later with respect to the rotation of disk 136. With the arrangement shown in FIGURE 1 the farther out slide 149 is pulled by knob 148, the earlier the photoelectric cell would be activated. Also, since increase in the phenomenon being sensed corresponds to rotation of the shaft 143 and disk 136 in the clockwise direction, the farther arm 140 is turned in a counterclockwise direction the earlier the photoelectric cell 138 would be energized. The arm 140 is shown as being in its furthest clockwise position within its 90° range of possible adjustment.

The assembly of shaft 143, disks 136 and 136′ and pointer 144 are indicated as having an operating angular movement from 0° to 270°. Arm 140 supporting light 137 and photoelectric cell 138 can be adjusted from its position shown through an angle of 90° counterclockwise from that position to move such light and photoelectric cell correspondingly circumferentially of the disks. When the pointer is in registry with the 0° end of the scale, the blank quadrant of disk 136 will be in registry with the light source and photoelectric cell. If the slide 149 is in its outermost position, as shown in FIGURE 1, and the arm 140 is swung 60° counterclockwise from the position shown in that figure, the leading end of the spiral section arc 145*a* would move into registry with the slot of bar 147 almost immediately when disk 136 and pointer 144 are rotated clockwise from zero position of the pointer so as to activate the photoelectric cell 138. When the arm 140 has been swung approximately 90° in the clockwise direction, however, the leading end of the spiral section arc 145*a* would not move into registry with the slotted bar 147 until the disk 136 had rotated through approximately 90°. In the situation illustrated the disk has rotated approximately 85° beyond the point at which energization of the photoelectric cell 138 was initiated, the arm 140 having been adjusted about 60° clockwise from its counterclockwise limiting position.

If later energization of the photoelectric cell 138 were desired, slide 148 would be pushed inward so that the center index mark would be in registry with the guide 150. The shutter 146 would then be in a radially adjusted position to obscure the photoelectric cell from light projected by light 137 through the translucent band arc 145*a*. Energization of the photoelectric cell would then occur by movement of the leading end of the band section arc 145*b* into registry with the slot of bar 147. The angular adjustment of arm 140 within its 90° sector of adjustment would also affect the time at which the photoelectric cell is energized.

If it were desired to defer to a greater extent energization of the photoelectric cell 138 the slide 149 could be pushed radially inward until the outermost index mark is in registry with the guide 150. In this position the shutter 146 would obscure the slot in bar 147 from light transmitted from light 137 through both the spiral sections arcs 145*a* and 145*b*. Energization of the photoelectric cell would then be initiated by movement of the leading end of the spiral section arc 145*c* into registry with the slot in bar 147. Again, the timing of such photoelectric cell actuation can be varied by the arcuate adjustment of arm 140. With such arm adjusted 30° clockwise from the position shown in FIGURE 1, energization of the photoelectric cell would be delayed to the fullest extent possible if the slide 149 were in its furthest inward position. It will be apparent that the leading end of the band section arc 145*c* would be required to turn through approximately 125° from the position of FIGURE 1 in order to reach registry with the slot in bar 147, since arm 140 in the position shown in FIGURE 1 has been adjusted approximately 60° clockwise from its counterclockwise limiting position.

Thus, even though the arm 140 is angularly adjustable through only approximately 90°, such adjustment in conjunction with radial adjustment of the slide 149 to any one of three positions will enable energization of the photoelectric cell 138 to be initiated at any angular displacement of pointer 144 throughout the 0° to 270° range of travel. While arcuate lengths of 90° have been selected for the sections 145*a*, 145*b* and 145*c* in conjunction with angular adjustment of arm 140 through an arc of 90°, the lengths of the spiral sections could be greater or less and the range of angular adjustment for arm 140 could be correspondingly greater or less. The number of arcuate sections of the spiral control band provided would, of course, determine the number of radial adjustments provided for slide 149 and the radial length of each adjustment would correspond to a difference in radius between adjacent arcuate sections of the spiral band.

The arrangement for activating the photoelectric cell 138 thus far described could be utilized to energize a control circuit. De-energization of such control circuit could be effected by activation of a second photoelectric cell. Consequently, it is desirable to provide an additional photoelectric cell arrangement in the apparatus of FIGURE 1 generally similar to that described. While such additional photoelectric cell arrangement could be activated by the spiral control band 145*a*, 145*b*, 145*c* of rotor disk 136, more room for the photoelectric cell mounting and control mechanism is provided by associating such mechanism with a second spiral control band on a second disk 136′ mounted on the same shaft 143 for rotation with it and pointer 144. The spiral band on this disk is composed of arcuate sections 145*d*, 145*e* and 145*f*, which correspond exactly in size, shape and arrangement with the spiral bands sections 145*a*, 145*b*, and 145*c*, respectively.

In this instance, the activating light 137′ and the photoelectric cell 138′ are supported at opposite sides of the disk 136′ by post 139′. The arm 140′ supporting such post from the rotative mounting 141′ is adjustable angularly through an arc of 90° in the near quadrant seen in FIGURE 1 which is located counterclockwise from, but adjacent to, the quadrant in which the arm 140 and post 139 are adjustable. The reason for this arrangement is that the de-energization of the control circuit is effected by de-energization of the photoelectric cell 138' when transmission of light to it from the light source 137' is interrupted. This situation would occur as the trailing end of a light-transmitting band section **145*d*, 145*e* or 145*f* moves out of registry with the slot in arm 147', the opening through which is controlled by the shutter 146'. The radial position of such shutter can be adjusted by moving radially knob 148' which is carried by slide 149' movable through guide 150' and attached to the shutter 146'**.

It will be evident that the construction and mounting of the light source and photoelectric cell mechanism cooperating with disk 136' is similar to that described in detail above in conjunction with disk 136, except that in this instance the shutter 146' is slidable to uncover a radially outer portion of the slot in bar 147', whereas the shutter 146 was adjustable to uncover the radially inner portion of the slot in bar 147. The reason for this difference is that in the innermost position of shutter 146 the slot in bar 147 would be shielded from light passing through the control band sections **145*a* and 145*b*, and would receive light through the light-transmitting arc 145*c* of the band. When the shutter 146' is disposed in its innermost position, however, light would be transmitted by the slot in bar 147' through all of the three arcuate sections 145*d*, 145*e* and 145*f* of the spiral band of disk 136'. With the shutter in this position the photoelectric cell 138' would be deenergized when the counterclockwise end of section 145*f* has moved out of registry with the slot in bar 147'**.

When the shutter 146 is in its intermediate position of radial adjustment the control circuit will be energized when the clockwise end of the spiral section **145*b* moves into registry with the slot in bar 147. When shutter 146' is in its intermediate position the control circuit will be de-energized when the counterclockwise end of the spiral control band section 145*e* moves out of registry with the slot in bar 147'. When the shutter 146 is in its outermost radial position the control circuit will be energized when the clockwise end of spiral section 145*a* moves into registry with the slot in bar 147. When the shutter 146' is in its radially outermost position the control circuit will be de-energized as the counterclockwise end of the spiral section 145*d* moves out of registry with the slot in bar 147'**.

The arm 140 is angularly adjustable in the left quadrant, as seen in FIGURE 1, and the arm 140' is angularly adjustable in the near quadrant as seen in this figure. Since each of the arcuate band sections are 90° in extent and the spirals of disks 136 and 136' are in circumferential registry, it will be evident that the clockwise end of one arcuate section of disk 136 will be in the same relationship to the slot in bar 147 as the counterclockwise end of the corresponding arcuate band section of disk 136' is to the slot in bar 147' if the arms 140 and 140' are correspondingly adjusted in their quadrants. Consequently, such arms and the shutters controlling energization of the respective photoelectric cells can be arranged to provide for de-energization of the control circuit within the range from a very short interval to almost 270° of spiral element movement after energization of such control circuit. Alternatively only one disk could be provided and a light source and photoelectric cell could be associated with each end, respectively, of the spiral element to effect energization and de-energization of the photoelectric cell by movement of such end.

In FIGURES 2 and 3 spiral bands are illustrated as being on the developed peripheries of cylinders forming rotors, instead of being on planar disks. Such spiral bands are therefore of generally helical shape, although each section of each spiral is of circular arcuate shape having a radius which is the radius of the cylinder. In FIGURE 2, as in FIGURE 1, the sensors utilize light-sensitive control mechanism, whereas in the arrangement shown in FIGURE 3 the sensors use electrical contact mechanism. In general, however, the construction and operation of the devices of FIGURES 2 and 3 are similar to those of FIGURE 1, and the principles employed are the same. The turn-on and turn-off switches may be connected in series in the same control circuit so that the circuit will be completed for operation when the energizing element is activated and the control circuit will be de-energized when the de-energizing element is deactivated.

In FIGURE 2 the periphery 152 of the cylinder has in it a control band element of generally helically-spiral shape composed of the developed arcuate sections **153*a*, 153*b* and 153*c*. These respective sections are axially offset so as to provide a stepped band of light-transmitting character. A light source 154 etxends axially of the cylinder at one side of its peripheral shell, and the photoelectric cell 155 is located in a corresponding position at the opposite side of such shell. These elements are mounted on a support 156 which can be moved circumferentially around the axis of the cylinder by grasping a knob 157. Such knob is attached to a slide 158 received in a guide 159 and such slide is attached to a shutter 160 slidable along the slotted bar 161 interposed between the spiral band and the photoelectric cell 155**.

Adjustable throughout the quadrant adjacent to that in which the light 154 and photoelectric cell 155 are adjustable is the control circuit de-energizing light 154' and photoelectric cell 155', which are supported on opposite sides of the peripheral shell of the cylinder by the support 156'. Such support may be adjusted circumferentially by grasping knob 157'. This knob is mounted on the end of slide 158' movable through guide 159' and attached to shutter 160' which is slidable along the slotted bar 161'. Such slotted bar is interposed between the photoelectric cell 155' and the cylinder's peripheral shell 152. As in the device of FIGURE 1 the shutters 160 and 160' in the device of FIGURE 2 are disposed at opposite sides of the spiral control band on the cylinder periphery. In this instance, however, the two light-sensitive control devices are arranged to cooperate with the same generally spiral band instead of different bands, as in the device of FIGURE 1.

When the shutter 160 is in its position farthest to the left, as seen in FIGURE 2, the photoelectric cell 155 will be energized by the light source 154 when the leading end of the arcuate band section **153*a* moves into registry with the slot in bar 161. When slide 158' is in its position farthest to the left the photoelectric cell 155' will be de-energized by movement of the trailing end of arcuate band section 153*a* out of registry with the slot in bar 161'. When the shutter 160 is shifted to the right, as seen in FIGURE 2, into its intermediate position the photoelectric cell 155 will be energized by the light source 154 when the leading end of the arcuate band section 153*b* moves into registry with the slot in bar 161. The control circuit will be de-energized by de-energization of photoelectric cell 155' when the shutter 160' is in its intermediate position by movement of the trailing end of arcuate band section 153*b* out of registry with the slot in bar 161'. Photoelectric cell 155 will be energized by light 154 to energize the control circuit when the shutter 160 is in its farthest position to the right, as seen in FIGURE 2, as the leading end of the arcuate band section 153*c* moves into registry with the slot in bar 161. When the shutter 160' is farthest to the right, as seen in FIGURE 2, photoelectric cell 155' will be de-energized to de-energize the control circuit when the trailing end of the band section 153*c* moves out of registry with the slot in bar 161'**.

By adjusting the shutters 160 and 160' appropriately in axial directions and by adjusting the supports 156 and 156' appropriately circumferentially of the cylinder within their respective 90° arcs, the photoelectric cell 155' can be de-energized very shortly after the photoelectric cell 155 has been energized, or up to almost 270° of spiral control element movement after energization of photoelectric cell 155. Because the energization of photoelectric cell 155 is accomplished by movement of the end of an arcuate section of the composite spiral control element into registry with the slot in bar 161 and de-energization of photoelectric cell 155' is accomplished by movement of the end of an arcuate section of the composite spiral control element out of registry with the slot in bar 161', such energization of the photoelectric cell 155 and de-energization of the photoelectric cell 155' can be accomplished very precisely.

In FIGURE 3 the developed cylinder periphery 152 carries a conductive spiral control element band generally in the shape of a helix composed of circular arcuate sections **153*d*, 153*e* and 153*f* offset axially in succession corresponding to the light-transmitting arcuate band sections 153*a*, 153*b* and 153*c*, respectively, of FIGURE 2. In this instance, however, instead of using light-sensitive elements in conjunction with a light-transmitting spiral control element band, contact fingers 162*a*, 162*b* and 162*c* are provided to energize the control circuit, and contact fingers 162*d*, 162*e* and 162*f* are provided to de-energize the control circuit. Fingers 162*a* and 162*b* are arranged in circumferential registry with electrically-conductive band section 153*d*, contact elements 162*b* and 162*e* are arranged in circumferential registry with band section 153*e* and contact elements 162*c* and 162*f* are arranged in circumferential registry with band section 153*f***.

As has been mentioned above, the controlled elements which cooperate with the spiral control element in each instance should be of a character which will produce no, or negligible, deterrence to movement of the spiral elements. Thus, the contact fingers **162*a***, *b*, *c*, *d*, *e* and *f* are arranged to contact the spiral band elements intermittently so as not to produce any appreciable friction which would retard rotation of the cylinder 152, even though the mechanism which rotates it is very delicate. For this purpose the contact elements **162*a*, 162*b* and 162*c* are mounted on the supported leg 163 of a U-shaped bimetallic support 164, in turn mounted on a mount 165 which is adjustable circumferentially of the cylinder 162 through a quadrant. Similarly, the contact fingers 162*d*, 162*e* and 162*f* are mounted on the supported arm 163' of the U-shaped bimetallic element 164', which is mounted on the mount 165' adjustable circumferentially of the cylinder 152** through a 90° arc.

The bimetallic elements 164 and 164' are arranged so that when their supported legs 163 and 163', respectively, are heated they will bend in a direction to lift the contact fingers **162*a***, *b* and *c* and **162*d***, *e* and *f*, respectively, out of engagement with the peripheral surface 152 of the cylinder. The cylinder will therefore be completely free to be turned in one direction or the other in response to a phenomenon being sensed without hindrance by the contacting fingers. To provide this type of operation the supported legs of the bimetallic elements can be heated periodically at arbitrarily selected intervals, such as once every half second or every second, for example. Such heating can be accomplished by electric resistance heating windings 166 on supported leg 163 and 166' on supported leg 163', which are energized by suitable, intermittently energized, circuit arrangements. If desired, the two windings 166 and 166' can be connected together in series or in parallel so that they will heat their respective bimetallic legs simultaneously to free the cylinder's periphery at the same time.

One terminal of the control circuit is connected to the band sections **153*d*, 153*e* and 153*f*; and wire 167, in circuit with the contact fingers 162*a*, 162*b* and 162*c*, can be another connection to the control circuit. Also, wire 167', in circuit with contact fingers 162*d*, 162*e* and 162*f*, can be another connection to the control circuit. If desired, wires 167 and 167' can be connected to the control circuit so that the circuit-energizing contact fingers 162*a*, 162*b* and 162*c* will be in circuit with the de-energizing contact fingers 162*d*, 162*e* and 162*f***.

Unlike the light-controlled elements described previously the contact fingers **162*a* to 162*f* are not adjustable axially of the cylinder's periphery 152, although each set of these contacts is adjustable circumferentially of the cylinder through 90°. Instead, the three contact fingers 162*a*, 162*b* and 162*c*, which are insulaed from each other, are connected respectively to three terminals of a shorting switch 168. Such shorting switch is arranged so that the switch arm in one position is connected to all of the fingers 162*a*, 162*b* and 162*c* (as shown in solid lines in FIGURE 3), in another adjusted position is connected only to both of fingers 162*b* and 162*c* and not to finger 162*a*, and in the third (broken-line) position is connected only to finger 162*c*. Similarly, the contact fingers 162*d*, 162*e* and 162*f*, which are insulated from each other, are connected respectively to terminals of a shorting switch 168'. In one position this switch is connected only to finger 162*d* (as shown in solid lines), in a second position is connected to both fingers 162*d* and 162*e* and in a third (broken-line) position is connected to all of the fingers 162*d*, 162*e* and 162*f***.

With the shorting switch 168 in the extreme right position, as seen in solid lines in FIGURE 3, the wire 167 would be energized when the leading end of the section **153*d* of the spiral control element is engaged by the contact finger 162*a*. The wire 167 would then remain connected in the circuit with the spiral as finger 162*a* traces band section 153*d* for 90°, then through contact 162*b* as it traces band section 153*e* of the spiral control element for 90° and finally through contact 162*c* as it traces band section 153*f* of the spiral control element for an additional 90° because the bridging element of the shorting switch is in engagement with all three terminals of such switch to which the contact fingers 162*a*, 162*b* and 162*c* are connected. If the switch were in the central position, however, wire 167 would not be placed in circuit with the spiral sections through the shorting switch until the leading end of band section 153*e* has come into engagement with the finger 162*b*. Thereafter a circuit from the switch to the conducting band would remain completed through finger 162*b* and band section 153*e* and through finger 162*c* and band section 153*f* because of the short effected by switch 168 between the two terminals corresponding to fingers 162*b* and 162*c*. If this switch were in its extreme left position shown in broken lines, wire 167 would not be placed in circuit with the spiral band until the leading end of band section 153*f* has come into contact with finger 162*c***.

When the rotor periphery 152 is moving in the indicated direction, section **153*d* of the spiral control element band would be traced by and remain in contact with finger 162*d* until the trailing end of such band section has moved out of engagement with such finger. If the shorting switch 168' were in its extreme right position, shown in solid lines in FIGURE 3, the wire 167' would be de-energized at that time. If, however, such shorting switch were in its central position the wire 167' would remain in circuit with the band until the trailing end of its central section 153*e* had moved out of contact with finger 162*e* because of the shorting action between the connection to finger 162*d* and to finger 162*e*. If the shorting switch were in its extreme left, broken-line, position wire 167' would remain in circuit with the spiral band until the trailing end of section 153*f* has moved out of contact with finger 162*f* because of the interconnection by the shorting switch of the connections to all of fingers 162*d*, 162*e*, and 162*f***.

Thus, if the wires 167 and 167' must be connected together to complete a control circuit, a connection between them would be maintained between the time a connection had been completed from wire 167 through shorting switch 168 to the spiral band and the time that the connection from the spiral band through switch 168' to wire 167' had been interrupted in the manner described above. Since both supports 165 and 165' for the bimetallic elements 164 and 164' area adjustable circumferentially of the cylindrical periphery 152 through approximately 90°, it is possible by appropriate selection of such circumferential adjustments and positioning of switches 168 and 168', respectively, to effect completion of a circuit between wires 167 and 167' through the spiral band for an angular movement of the cylindrical periphery 152 from a few degrees to approximately 270°. In considering such circuit, however, it will be understood that circuit-sustaining mechanism would be provided to compensate for the periodic momentary interruption in the circuit effected by flexure of the bimetallic supported arms 163 and 163' so that lifting of the contact fingers periodically would not effect circuit-controlling interruption of the connection between wires 167 and 167'.

Figure 4:
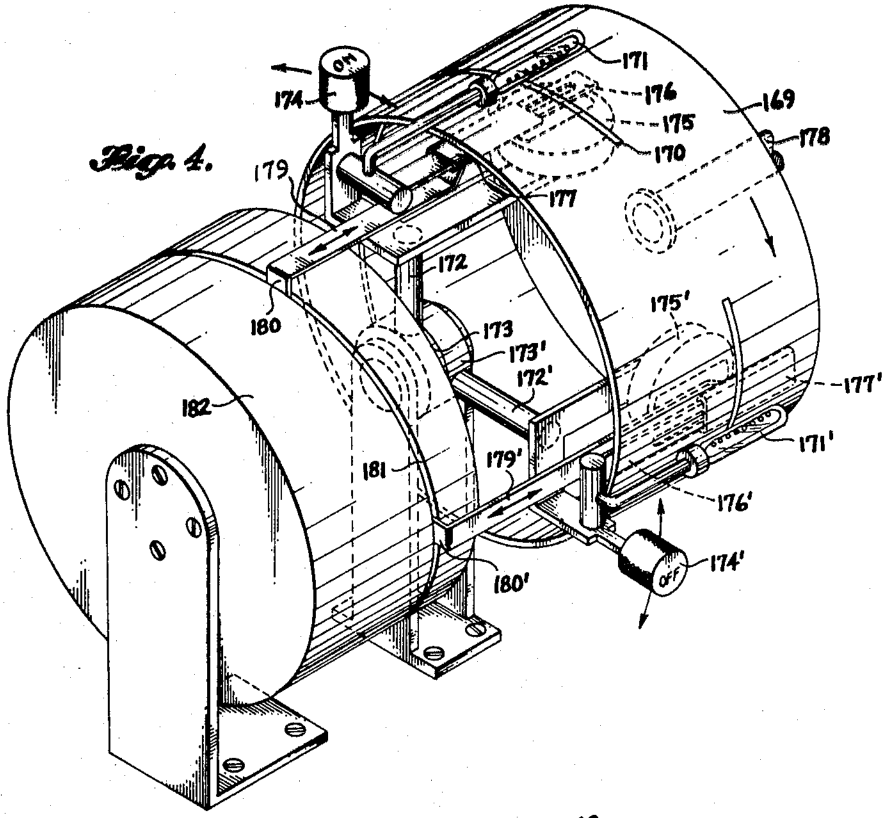
FIGURE 4 is a top perspective of mechanism having a helical-spiral, light-transmitting band having two track-controlled elements
Figure 5:
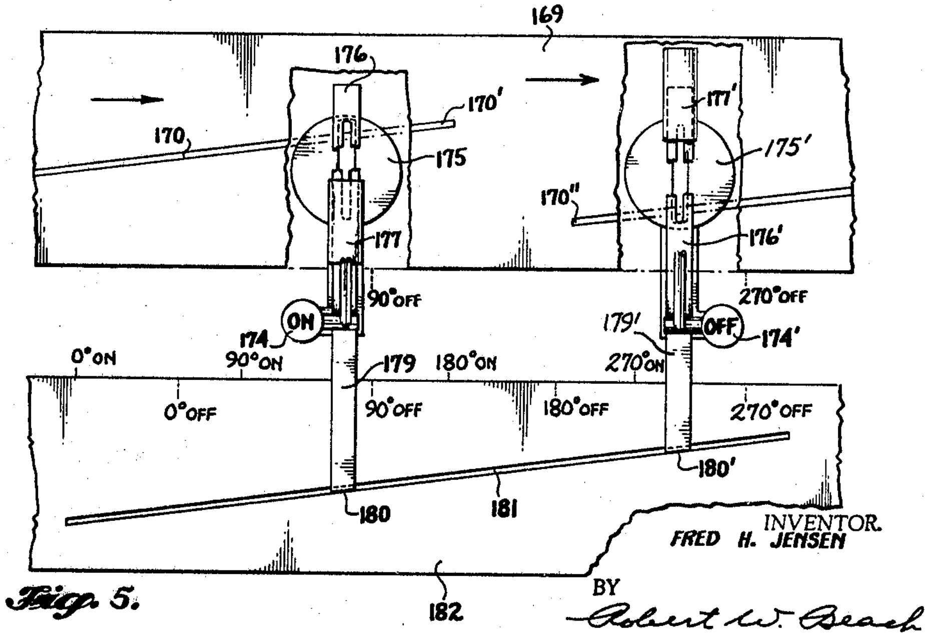
FIGURE 5 is a diagrammatic plan showing the cylinders developed.

In FIGURES 4 and 5 the cylindrical periphery rotor 169 has a continuous smooth spiral control element 170, which is shown as a light-transmitting band in FIGURE 4 and in developed form in FIGURE 5. At the outer side of the cylindrical peripheral rotor 169 are mounted two sensor light sources 171 and 171' of an extent axially of the rotor 169 sufficient to span the entire axial variation of the spiral band. These lights are carried by posts 172 and 172', respectively, mounted on rings 173 and 173' for circumferential adjustment about the axis of the cylindrical peripheral member 169. Such adjustment can be effected conveniently by grasping knobs 174 and 174' connected to their respective posts 172 and 172'.

The posts 172 and 172' also support sensor photoelectric cells 175 and 175', respectively, in registry with the sensor light sources 171 and 171', but located on the opposite sides of the peripheral member 169. Between such photoelectric cells and the peripheral member are slotted bars 176 and 176', respectively, which restrict the area of the photoelectric cells 175 and 175' that could be exposed to light from the light sources 171 and 171'. These slots extend transversely of the length of spiral element 170 and axially of the peripheral member 169 and are of a length at least as great as the total axial displacement of the spiral control element 170. The portion of the length of the slot in bar 176 through which light can pass can be controlled by the position of a shutter 177 axially of the peripheral member 169 and the portion of the slot exposed in bar 176' can be controlled by the axial position of shutter 177'. Such light sources 171 and 171', photoelectric cells 175 and 175' and slotted bars constitute controlled mechanism controlled by the spiral control element band 170 of rotor 169.

Proper adjustment of the shutters 177 and 177' enables the points of energization and of de-energization of a control circuit effected by energization and de-energization of the photoelectric cells 175 and 175', respectively, to be established at any selected locations circumferentially of the rotor 169 within a wide range, such as approximately 270° of circumferential extent of the rotor. At the same time it is preferred to have the point of circuit energization be precise and also to have the point of de-energization be precise. Energization of the control circuit is therefore effected by the leading end 170' of the light-transmitting spiral band 170 moving circumferentially into registry with the slot in bar 176, and de-energization of the control circuit is effected by the trailing end 170'' of the light-transmitting track moving out of registry with the slot in bar 176'.

In order to insure that the photoelectric cell 175 will be energized only at one particular location of the spiral control element and that energization of such photoelectric cell will be effected by the end 170' of such element, the shutter 177 is arranged to be adjusted axially of the peripheral member 169 as the photoelectric cell 175 is set in various positions circumferentially so that such shutter will obscure the trailing portion of the track beyond the photoelectric cell. For this purpose it is assumed that the photoelectric cell 175 will be energized by movement of the peripheral rotor 169 in the direction indicated by the arrows in FIGURES 4 and 5 as such rotor is rotated by a torque applied to shaft 178, which supports the peripheral member 169, in response to a phenomenon being sensed. Such automatic axial adjustment of shutter 177 is effected by the bar 179 which has a lug 180 engaged in the spiral track slot 181 of stationary cylinder 182, which is parallel to the spiral control element 170 of rotor 169. Such track is of spiral shape corresponding precisely to the spiral shape of the light-transmitting band 170 on peripheral member 169.

Similarly, the shutter 177', which is arranged to obscure a portion of the slot in bar 176' for controlling the exposure of photoelectric cell 175' to light passing through the light-transmitting band 170, is automatically adjustable axially of the peripheral member 169. Such adjustment is effected by the bar 179' having a lug 180' engaged in the spiral track slot 181. Adjustment of such shutter 177' axially of the member 169 is effected in the axial direction opposite that of shutter 177 for the circuit-energizing photoelectric cell 175, so that the leading end portion of the spiral band 170 will be obscured if the member 169 should be turned far enough to move such leading portion of the band circumferentially into registry with the photoelectric cell 175'.

In order to accomplish energization of the control circuit it is necessary that both photoelectric cells 175 and 175' be energized. This is the condition illustrated in the developed view of FIGURE 5. The rotor 169 has turned to the right far enough so that the leading end 170' of the spiral control element 170 has passed across the slot in bar 176, enabling light to be transmitted from the light source 171 through the slot of bar 176 to activate the photoelectric cell 175. Moreover, the trailing end 170'' of the spiral control element 170 has not moved far enough to the right so as to cut off transmission of light from the light source 171' through the slot in bar 176' to de-energize the photoelectric cell 175'. The position of the "on" photoelectric cell has been shown in FIGURE 5 as being at approximately 130° of rotation of the peripheral member 169 and the de-energizing photoelectric cell 176' is shown and being located at approximately 235° of rotation of the peripheral member 169. Thus, between the rotative positions of the rotor 169 of 130° and 235° the control circuit would be energized, and in other rotative positions of such member the control circuit would be de-energized.

To enable the sensor photoelectric cell 175 to energize the control circuit immediately after the rotor 169 has begun to move from its zero position (in which band leading end 170' is in registry with the left end of slot 181 as seen in FIGURE 5), and to enable the photoelectric cell 175' to de-energize the circuit after the peripheral member 169 has rotated through a full 270°, while controlling both the photoelectric cell 175 and the photoelectric cell 175' by the same spiral control element 170, it is necessary for the circumferential extent of such element to exceed the control range of 270° by an amount equal to the width of a photoelectric cell 175, which is approximately 45°. The setting scale for the "off" photoelectric cell 175' is therefore displaced circumferentially of the rotor 169 in the direction of rotation of the rotor from the setting scale for the "on" photoelectric cell 175 by an angular displacement of 45°, as shown in FIGURE 5.

Obviously, in every instance the "on" photoelectric cell 175 must be energized to energize the control circuit while the "off" photoelectric cell 175' is energized and before it is de-energized. This condition is assured by two circumstances. First, the shutter operating lugs 180 and 180' are arranged in the same spiral track slot 181 so that the two photoelectric cells cannot pass each other. Second, the two shutters are coordinated so that the photoelectric cell 175 cannot be energized other than by movement of the leading end 170' of spiral element band 170 into registry with it, and the photoelectric cell 175' cannot be re-energized by the leading end 170' of band 170 moving into registry with it after it has been de-energized by withdrawal of the trailing end 170'' of the band from it because of the spiral shape of the band 170 resulting in the spiral control element ends 170' and 170'' being offset axially of the rotor. The shutter 177 obscures the portion of the slot in bar 176 which would enable the trailing portion of the spiral control element band 170 to transmit light for energizing the cell 175 in the initial stages of rotation of rotor 169 from zero when such photoelectric cell 175 is set circumferentially for late energization of the control circuit. Also, the shutter 177' is set to prevent re-energization of the photoelectric cell 175' to reactivate the control circuit by light transmitted through the leading portion of the spiral control element band 170 when the "off" photoelectric cell 175' is adjusted circumferentially for early de-energization of the control circuit.

It will be evident, therefore, that this spiral element controlled mechanism affords precise energization and de-energization of the control circuit through a wide range of adjustment of both the energizing and de-energizing circuit devices, namely, 270°. Engagement of the lugs 180 and 180' with the opposite ends of spiral track 181 limits adjustment of the photoelectric cells beyond this range. At the same time the duration of activation of the control circuit can be regulated within the same range, that is, such duration may be for only a few degrees of rotation of rotor 169 at any point in the 270° rotation of such member, or the control circuit can be energized throughout the entire 270° arc of rotation of the rotor as the controlled mechanism traces the spiral control element. While the device shown in FIGURES 4 and 5 utilizes the combination of a helical-spiral control band 170 and a helical-spiral sensor-positioning track 181, similar mechanism could be controlled by the combination of a planar spiral control element and a corresponding planar sensor-positioning spiral track utilizing the same principle, as described below in connection with FIGURES 12 through 24.

Figures 6, 7, 8, 9:
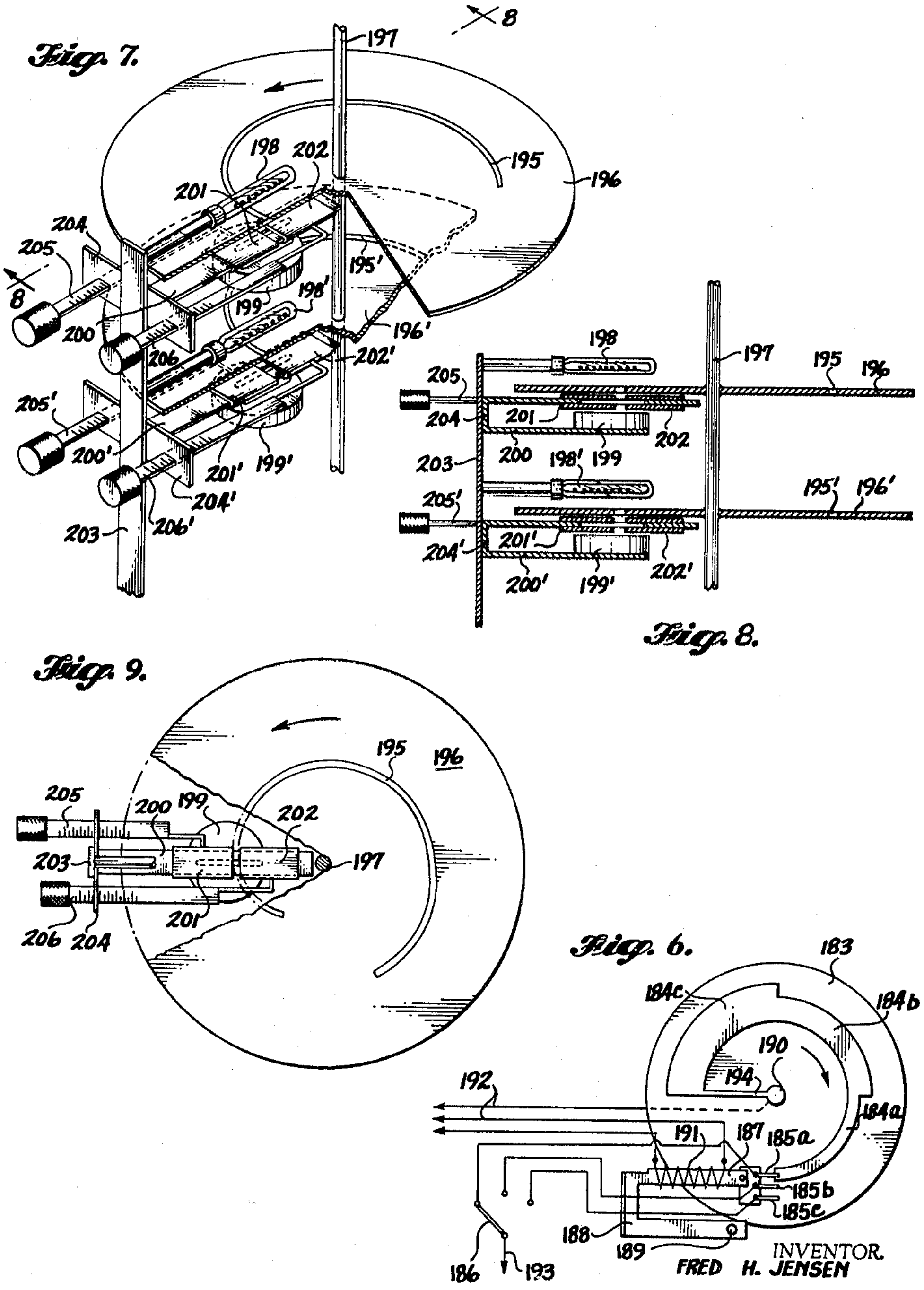
FIGURE 6 is a plan of an electrical-contact type of planar spiral sensing mechanism.
FIGURE 7 is a top perspective of a planar spiral type of sensing device including multiple disks, each disk having cooperatively adjustable controlled elements, parts being broken away.
FIGURE 8 is a diametral section through such device taken on line 8—8 of FIGURE 7.
FIGURE 9 is a plan of such device having parts broken away.

In FIGURE 6 an arrangement is shown in which a spiral control element band having electrically conducting characteristics is provided. The band is shown to be of the stepped type including a narrow initial section 184a, a wider intermediate section 184b and a still wider terminal section 184c. Contact members 185a, 185b and 185c are arranged to trace and contact these various band sections, respectively, as the rotor disk 183 rotates. Contact 185a will be engaged with the electrically conducting band throughout rotation of disk 183 correspondingly to the full circumferential extent of sections 184a, 184b and 184c; contact 185b will be in engagement with the band during rotation of the disk throughout the arc of sections 184b and 184c; and contact 185 will be in engagement with the band only during rotation of the disk through the arcuate extent of section 184c. Only one of the contacts 185a, 185b and 185c will be connected in the control circuit at any given time. By selective setting, the arm of switch 186 may be placed in circuit with any one of three contacting members, as indicated in FIGURE 6.

The contact fingers 185a, 185b and 185c are mounted on the free end of the flexing leg 187 of a U-shaped bimetallic element 188 supported by a post 189. Preferably each of the spiral control element band sections 184a, 184b and 184c is a quadrant in extent and the post 189 should be mounted for circumferential adjustment around the axis of shaft 190, on which the disk 183 is carried. Such circumferential adjustment preferably is of approximately 90° in extent so that it is possible to control the interval of rotation preceding contact of one of the fingers 185a, 185b and 185c with its respective spiral control element section.

Also, it is desirable for the contact fingers 185a, 185b and 185c not to produce any appreciable resistance to rotation of disk 183. To accomplish this result the contact fingers are raised periodically from contact with the surface of the disk, as described in connection with FIGURE 3. Such lifting action is effected by thermal deformation of the flexing leg 187 of the bimetallic element 188 effected by heating it with the resistance heating element 191 wound on such flexing leg. The circuit 192 for energizing such heating resistance preferably is dependent of the control circuit including wire 193 connected to the switch 186 and 194 connected to the spiral track 184a, 184b, 184c through the shaft 190.

In the rotary control mechanism shown in FIGURES 7, 8 and 9 the spiral control element 195 is of planar type on rotor disk 196 and can transmit light. While, for the type of control there illustrated, only a single spiral and disk is required, any number of disks 196 and 196' having spirals 195 and 195' can be mounted on the same shaft 197 for conjoint rotation. With each of the spiral elements is associated light-sensitive controlled mechanism, illustrated as including a light source 198 or 198' and a light-sensitive photoelectric cell 199 or 199', respectively. Activating light is received by each photoelectric cell from its corresponding light source through the corresponding light-transmitting spiral control element band and a slot or band in a corresponding bar 200 or 200'. The length of the band or slot in each of such bars extends radially of the disk 196 and transversely of the length of the related spiral control element.

In this form of the control mechanism two shutters 201 and 202 are provided on bar 200 adjustable to vary the size and position of the light-transmitting passage through the slot in such bar. Corresponding shutters 201' and 202' are provided for bar 200'. The type of control circuit utilized with this type of mechanism is one in which such control circuit is energized as long as the corresponding photoelectric cell is activated. The position of the shutters 201 and 202 will determine both the duration of activation of the photoelectric cell and the rotative position of disk 196 corresponding to such activation.

In this particular instance the light sources 198 and 198', the photoelectric cells 199 and 199' and the bars 200 and 200' are all supported by a stationary post 203, which is not adjustable circumferentially around shaft 197. This post also carries guides 204 and 204' through which extend adjustable slides connected to the shutters. Slides 205 and 205' are connected respectively to the "off" shutters 201 and 201'. Slides 206 and 206' are connected respectively to the "on" shutters 202 and 202'. The farther the shutters 201 and 202 are moved apart the greater will be the angle of rotation of disk 196 during which photoelectric cell 199 is energized.

Assuming that the rotor disk is rotated by shaft 197, in response to a phenomenon being sensed, in the counterclockwise direction as indicated by the arrows in FIGURES 7 and 9, the farther inward shutter 202 is located radially the smaller will be the angle of rotation of disk 196 required to move a portion of the spiral control band 195 into registry with the light-transmitting band or slot in bar 200. The farther slide 205 is pushed inward to move shutter 201 radially inward the narrower will be the gap between the shutters 201 and 202, and the smaller will be the further angular displacement of disk 196 required in a counterclockwise direction to move the spiral band 195 into a position in which it will be obscured from the photoelectric cell 199 by the shutter 201. As soon as such complete covering occurs the photoelectric cell 199 will be de-energized. Thus, by simply sliding slides 205 inward or outward the rotative position of disk 196 at which the photoelectric cell 199 is initially activated and the rotative position of disk 196 at which it is deactivated can be determined. Coincidentally, of course, the extent of the rotation of disk 196 during which photoelectric cell 199 is activated will be established for any adjusted position of shutters 201 and 202.

Figure 10:
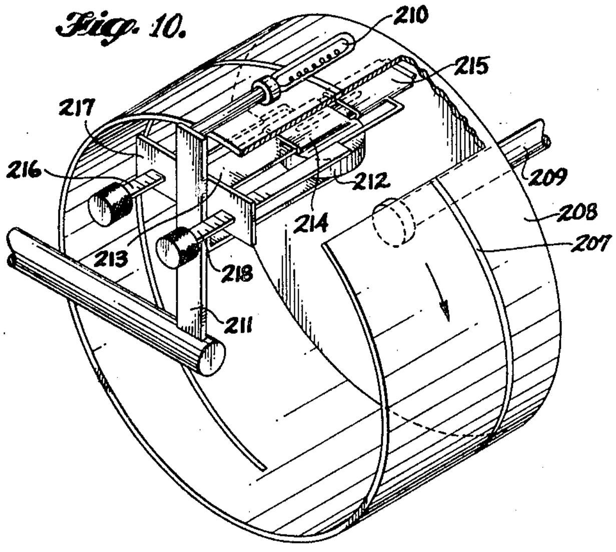
FIGURE 10 is a top perspective of a sensing device having a helically-spiral, light-transmitting band including cooperating controlled elements, parts being broken away.
Figure 11:
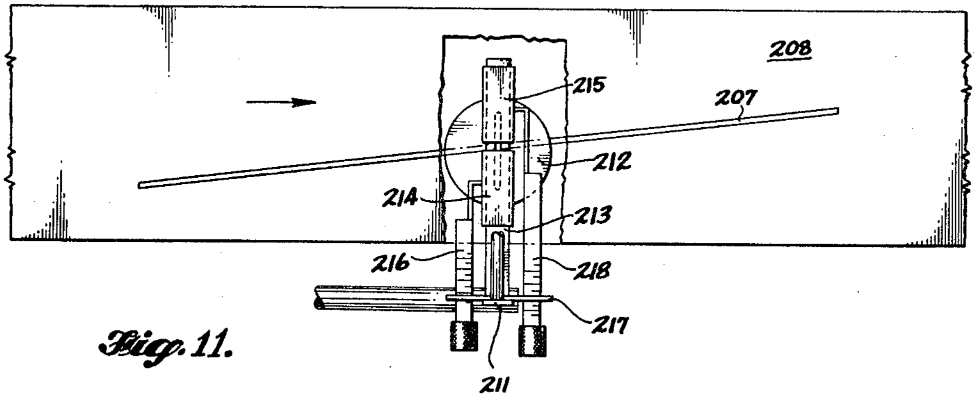
FIGURE 11 is a plan of such device with the track and cylinder periphery in developed condition.

The mechanism shown in FIGURES 10 and 11 operates on the same principle as that disclosed in FIGURES 7, 8 and 9. In this instance, however, the spiral control element 207 is of the helical type instead of the planar type and is carried by the cylindrical periphery of rotor or drum 208 supported for rotation by shaft 209 in response to a phenomenon being sensed. In this instance the sensor controlled by the spiral control element includes light source 210 supported by post 211 at the outer side of the rotor 208 and the photoelectric cell 212 supported by such post at the inner side of the rotor. The bar 213 has in it a light-transmitting band or slot having its length extending axially of the rotor and transversely of the length of the spiral control element 207 which can be covered to a greater or lesser extent by shutters 214 and 215. The axial position of shutter 214 can be altered by lengthwise reciprocation of a slide 216 connected to it and guided for sliding movement through a guide 217. The position of shutter 215 axially of peripheral member 208 can be altered by lengthwise movement of slide 218 through guide 217.

FIGURE 11 shows the shutters 214 and 215 close together so that the control circuit energized by activation of sensor photoelectric cell 212 would continue to be energized for only a small angular movement of drum 208. Assuming that the drum is turned in the direction indicated by the arrows in FIGURES 10 and 11 in response to changes in the phenomenon being sensed, the photoelectric cell would be energized as a portion of the spiral control element slot 207 moves out from registry with shutter 215 and the energization of the cell would continue until member 208 has turned far enough to move the spiral control slot into registry with the "off" shutter 214 as the sensor traces the spiral control element 207 during rotation of rotor 208. Graduations provided on slides 216 and 218 will enable the shutters 214 and 215 to be set to effect activation and subsequent deactivation of photoelectric cell 212 at such rotative positions of shaft 209 and rotor 208 as may be desired. The control circuit will continue to be energized as long as the photoelectric cell 212 remains activated.

The embodiment of the invention shown in FIGURES 12 to 15 is generally similar to that of FIGURES 4 and 5 in that the spiral control element has a smooth continuous spiral instead of a stepped spiral and the controlled member is adjustable by engagement with a smooth spiral track parallel to the spiral of the spiral control element. In the device of FIGURES 12 to 15, however, the spiral is of the planar type instead of being a helical spiral like that of the device in FIGURES 4 and 5. The value of the phenomenon being sensed, such as temperature or pressure, is indicated on a circular scale 220 by the position of a pointer 221 which is established by rotation of shaft 222. The control element is disk 223 having a spiral periphery and carried by and rotated by shaft 222. The ends of the spiral are offset radially and joined by the radial step 224.

At one side of the spiral control-element disk 223 is a light source 225, shown as being below the disk, and at the other side of the disk is a light-sensing element 226 shown as a photoelectric cell located above the disk. The relationship of the light and photoelectric cell relative to the disk is shown clearly in FIGURES 14 and 15. These elements are mounted on a block 277 which engages the smooth spiral periphery 228 of disk 229 supported stationarily so that its spiral periphery is parallel to the spiral periphery of control element 223 when step 224 of that element is in radial alignment with the zero graduation of scale 220.

Disk 229 providing the spiral track 228 is supported stationarily in cantilever fashion by projection 230 being secured to a spacer block 231 mounted on the scale plate of the instrument. Block 227 is held in engagement with the spiral track 228 by a plate 232 attached to the block and overlying one side of the disk 229 while a flange 233 projecting from the block 227 underlies the marginal portion of such disk. Plate 232 is urged radially inward by spring 234 engaged with a post 235 in the center of disk 229 to hold block 227 in abutment with the spiral edge 228 of the disk.

Block 227 carrying the light source 225 and the photoelectric cell 226 can be shifted to any desired circumferential location around the spiral track 228 as indicated, for example, by the solid-line position and the broken-line position shown in FIGURE 13. Such adjusted position will correspond to the value on scale 220 of the phenomenon being sensed at which a control operation is to be effected. The photoelectric cell 226 will be connected in a suitable control circuit to accomplish the control function by its energization. During rotation of the spiral control element 223 from a position in which the step 224 is in registry with the zero index on scale 220 to a position in which such step coincides with the setting on track 228 of block 227, the spiral margin of disk 223 will shield the photoelectric cell 226 from the light source 225.

When the step 224 of the spiral control element disk 223 has moved from alignment with the zero graduation of scale 220 to the position shown in FIGURES 12 and 13, the spiral periphery of disk 223 will still block projection of light 225 onto the photoelectric cell 226 as shown in FIGURE 14. When pointer 221 moves up scale to graduation 15 of scale 220, however, the end of the spiral formed by step 224 will move out from between light 225 and photoelectric cell 226 so that the photoelectric cell will be energized by the light. Such energization of the photoelectric cell will actuate such a signal or effect such a control function as may be programmed. As is evident from FIGURE 15, the photoelectric cell 226 and its control circuit will continue to be energized as the pointer 221 and step 224 continue to move up scale beyond the graduation 15 at which the block 227 is set in FIGURE 13.

If the block 227 is adjusted to the broken-line position shown in FIGURE 13, energization of photoelectric cell 226 will be postponed until the pointer 221 has reached graduation 21 on the scale. If the block 227 is moved to the fullest extent along track 228 which is possible, energization of photoelectric cell 226 will be postponed until the pointer 221 has reached the graduation 30 on the scale which represents an angular travel of the pointer 221 along scale 220 through an angle of 270°. Conversely, of course, the farther block 227 is moved in a counterclockwise direction along track 228, the smaller will be the angular movement of pointer 221 along scale 220 required to effect the control action. Irrespective of the position of block 227, the photoelectric cell 226 will remain energized after step 224 has passed it during clockwise rotation of disk 223 to whatever extent such disk rotation may continue up to full scale travel of pointer 221.

In the device shown in FIGURES 16 to 19 inclusive the scale 220, pointer 221, spiral control element disk 223 and radial step 224 are the same as described in connection with FIGURES 12 to 15 inclusive. In this instance, however, two control devices are provided, each including a light source and a photoelectric cell. FIGURE 16 shows a light source **225*a* and a photoelectric cell 226*a* which are mounted on a slide 227*a*. Such slide has a projection 236*a* of dovetail cross section which is received in a dovetail groove 228′ formed in the inner periphery of a ring 229′. Another light source 225*b* and another photoelectric cell 226*b* are carried by another slide 227*b* that has a dovetail projection slidably received in the same groove 228′**.

The inner periphery of ring 229′ is of spiral shape, as shown in FIGURE 16, and such spiral is parallel to the spiral periphery of control element disk 223 when the pointer 221 and shoulder 224 are in radial alignment with the zero calibration of scale 220. The slide **227*a* and the slide 227*b* may be adjusted independently to various circumferential positions around the ring. This ring is supported in cantilever fashion by a projection 230'. The lights 225a and 225b and the photoelectric cells 226a and 226b are arranged relative to their respective slides 227a and 227b so that when the slides are moved into close proximity along groove 228', as shown in FIGURE 17, the lights 225a and 225b and the photoelectric cells 226a and 226b** can be disposed in substantially the same radial position.

To enable the light source 225a and 225b and the photoelectric cells 226a and 226b to be arranged in the same radial plane passing through the axis of shaft 222 and still enable the marginal portion of the disk 223 to intervene between the light source and its respective photoelectric cell, such light sources and photoelectric cells are offset radially relative to each other. Thus, as shown best in FIGURE 18, the light 225a is offset radially outward from the photoelectric cell 226a and the light source 225b is offset radially inward from the photoelectric cell 226b. At the same time, the light sources and the photoelectric cells are arranged so that the line joining the light source 225a and the photoelectric cell 226a intersects the line joining the light source 225b and the photoelectric cell 226b approximately at the level of the radial step 224 of disk 223 when the two light sources and the two photoelectric cells are in substantially the same radial plane. Consequently, clockwise rotation of disk 223 from the position shown in FIGURE 17 would cause the step 224 to move out of interfering position between both light sources and their respective photoelectric cells simultaneously.

Ordinarily, of course, the two sets of control devices would be spaced circumferentially of ring 229' so that one set of control devices could initiate an operation and the other set of control devices could terminate the operation, for example. In some instances, however, such as where it is desired to maintain a temperature at almost an exact value, the two slides 227a and 227b would be quite close together. Alternatively, it may be desirable to locate two such control devices very close to each other or in registry with each other to effect two different types of control operations.

In order to prevent the light source of one control device from actuating the photoelectric cell of the other control device where the two control devices are placed quite close together, it is desirable to provide a directional shield for each light source. Particularly in FIGURES 18 and 19, the shield 237a for the light source 225a and the shield 237b for the light source 225b are shown. The shield 237a shields the light source 225a from activating the photoelectric cell 226b however close together the control devices may be located. Correspondingly, shield 227b on light 225b would prevent this light source from energizing photoelectric cell 226a.

FIGURES 20 and 21 show alternate types of light sources for activating photoelectric cells 226a and 226b, respectively. In this instance, the original light source is an incandescent bulb 238 mounted by a bracket 239 substantially directly above the shaft 22 which supports the spiral control element disk 223. From this casing flexible light-conducting reeds extent down to holders 225c and 225d supported, respectively, on slides 227a and 227b. The reed holder 225c is directed toward photoelectric cell 226a and the reed holder 225d is directed toward photoelectric cell 226b. Because of the concentrated beam of light projected by the reeds from their ends, it is not necessary to provide any shielding for the lights comparable to the shields 237a and 237b in order to prevent a light source from activating the wrong photoelectric cell. In addition, because of the flexibility of the reeds, the slides 227a and 227b can be adjusted throughout the 270° angle of the groove 228' by using a single light source 238.

In FIGURES 22, 23 and 24 again the spiral control element 223 is similar to that shown in FIGURES 12 to 15 and FIGURES 16 to 19, but in this instance the control element is shown as being able to control any of four controlled elements, either individually or simultaneously. Such controlled elements are illustrated as microswitches 240a, 240b, 240c and 240d. These switches include spring leaves 241a, 241b, 241c and 241d, respectively, the ends of which are engageable by chamfers of radial step 224' to actuate switch buttons 242a, 242b, 242c and 242d, respectively.

Each of the microswitches is supported by a dovetail slide 243a, 243b, 243c and 243d, respectively, which are engageable in separate spiral dovetail tracks 228a, 228b, 228c and 228d, shown best in FIGURES 23 and 24. By providing separate tracks, all four switches can be arranged in adjacent relationship to be actuated simultaneously by the chamfered surfaces of step 224', as shown in solid lines in FIGURES 22, 23 and 24. Each of these switches can, however, be adjusted circumferentially of the spiral track on its disk 229a, 229b, 229c or 229d as indicated in broken lines in FIGURE 22 so that the several switches will be actuated by the spiral control disk 223 at different times.

In the type of instrument shown in FIGURES 16 and 17, the two slides are mounted in the same dovetail tracks so that while the two controlled devices could be brought into radial registry as explained, they could not pass each other. In the type of structure shown in FIGURES 22, 23 and 24, however, each of the switches 240a, 240b, 240c and 240d can be adjusted to any circumferential position entirely without hindrance by the location of any other switch. Binding posts 244a, 244b, 244c and 244d are provided on the respective switches to which lead wires can be connected, and these wires shuld be of sufficient length to enable full circumferential adjustment of each switch to be accomplished.

The switches 240a, 240b, 240c and 240d can be of the normally open type or of the normally closed type. As long as the leaf of a particular switch is not engaged with a chamfered surface of the step 224', such switch will be in its normal condition. Engagement of the switch leaf with such a chamfered surface will shift the switch to its actuated condition and the switch will be held in such condition as long as the leaf is engaged with the spiral margin of control disk 223. Reverse rotation of the disk sufficient to move its margin out of engagement with such switch leaf will, of course, allows the switch to return to its normal condition.

I claim:

1. Signal-controlling mechanism comprising controlled means, rotatable means rotatable relative to said controlled means and carrying a spiral control element operable to actuate said controlled means when disposed in a predetermined rotative position relative to said controlled means, means for turning said rotatable means in response to changes in a phenomenon being sensed, and supporting means normally supporting said controlled means stationarily but operable to guide said controlled means for adjustment circumferentially of the axis of said rotatable means and further operable to guide said controlled means for movement in a direction transversely of the length of said control element spiral into any of various selected stationary positions corresponding, respectively, to predetermined controlled means actuating positions in which said spiral control element can be placed by turning of said rotatable means effected by corresponding values of the phenomenon being sensed.

2. The signal-controlling mechanism defined in claim 1, in which the supporting means guide the controlled means for adjustment along a spiral path substantially parallel to the control element spiral when the rotative means are in a particular predetermined rotative position.

3. The signal-controlling mechanism defined in claim 1, in which the supporting means includes stationary track means and track-guided means supporting the controlled means for movement along said track means.

4. The signal-controlling mechanism defined in claim 1, in which the controlled means are actuated by movement of an end portion of the spiral control element in registry with the controlled means.

5. The signal-controlling mechanism defined in claim 4, in which the spiral control element includes a plurality of arcuate sections relatively offset radially of the spiral and the end portion of the spiral control element movement of which actuates the controlled means is an end portion of one of said sections.

6. The signal-controlling mechanism defined in claim 4, in which the spiral control element is a spiral continuously smooth from end to end and the end portion of the spiral control element movement of which actuates the controlled means is an end portion of such spiral.

7. The signal-controlling mechanism defined in claim 1, in which the spiral control element is a spiral continuously smooth from end to end and effects actuation of the controlled means by movement of a side portion of the spiral control element in registry with the controlled means.

8. The signal-controlling mechanism defined in claim 7, in which the spiral control element is a spiral band, and the supporting means supports the controlled means for adjustment to alter the arcuate length of the spiral band that can be disposed in registry with the controlled means by rotation of the rotatable means.

9. The signal-controlling mechanism defined in claim 4, in which the spiral control element is of an arcuate length exceeding 180°.

10. The signal-controlling mechanism defined in claim 1, in which the controlled means is a sensor including energy-radiating means and energy-receiving means located so that the spiral control element will control transmission of energy between said energy-radiating means and said energy-receiving means by rotation of the rotatable means.

11. The signal-controlling mechanism defined in claim 10, in which the energy-radiating means is a light source at one side of the spiral control element, and the energy-receiving means is a photoelectric cell at the other side of the spiral control element energizable by light from said light source when transmission of light from said light source to said photoelectric cell is not interrupted by the rotatable means.

12. The signal-controlling mechanism defined in claim 11, in which the spiral control element is a light-transmitting band through which light can pass from the light source to the photoelectric cell when said band is in registry with the light path between the light source and the photoelectric cell.

13. The signal-controlling mechanism defined in claim 1, in which the spiral control element is an electrically-conducting band, and the controlled means include electric contact members engageable with said band.

14. The signal-controlling mechanism defined in claim 13, in which the electric contact members are bimetallic, and electrical resistance heating means operable to heat said contact members periodically to disengage them from said band when in registry therewith.

15. The signal-controlling mechanism defined in claim 1, in which the rotatable means is of cylindrical shape and the spiral control element is of helical spiral shape.

16. The signal-controlling mechanism defined in claim 15, in which the supporting means includes a stationary cylindrically helical track and track-guided means supporting the controlled means for movement along said track.

17. The signal-controlling mechanism defined in claim 1, in which the rotatable means is planar and the spiral control element is of planar spiral shape.

18. The signal-controlling mechanism defined in claim 17, in which the spiral control element is a spiral continuously smooth from end to end, the spiral is of substantially 360° in extent, and a substantially radial step joins the adjacent ends of the spiral, which step is operable to actuate the controlled means by rotation of the rotatable means when said step is in registry with the controlled means.

19. The signal-controlling mechanism defined in claim 18, in which the controlled means includes a sensor having a light source at one side of the rotatable means and an associated photoelectric cell at the opposite side of the rotatable means and the line of light transmision between said light source and said photoelectric cell is disposed in a location radially of the rotatable means for intersection by the step.

20. The signal-controlling mechanism defined in claim 19, in which the controlled means includes a second sensor having a light source at one side of the rotatable means and an associated photoelectric cell at the opposite side of the rotatable means, and the supporting means supports the two sensors for independent adjustment circumferentially of the axis of the rotatable means with the path of light from the light source to the photoelectric cell of one sensor inclined in one direction and the path of light from the other light source to its photoelectric cell inclined in the opposite direction in mutually crossing relationship at a location in which each path of light can be intersected by the step of the spiral control element.

21. The signal-controlling mechanism defined in claim 20, in which the controlled means includes switch means engageable with the spiral control element step to be actuated by such engagement.

22. The signal-controlling mechanism defined in claim 21, in which the switch means includes a switch arm, and the spiral control element step is chamfered for engagement with said switch arm.

23. The signal-controlling mechanism defined in claim 21, in which the switch means includes a plurality of switches, and the supporting means includes a plurality of means supporting the switches independently for adjustment relative to each other.

24. The single-controlling mechanism defined in claim 17, in which the controlled means includes two sensors, and the supporting means includes two substantially parallel spiral tracks, first track-guided means supporting one of said sensors from one of said tracks and second track-guided means supporting the other of said sensors from the other of said tracks.

References Cited

UNITED STATES PATENTS

| | | | |
|---|---|---|---|
| 1,797,370 | 3/1931 | Rupp | 337—107 X |
| 2,263,228 | 11/1941 | Wolff et al. | 250—231 |
| 2,480,134 | 8/1949 | Harrington | 250—231 |
| 2,964,240 | 12/1960 | Brinster et al. | 250—219 X |
| 2,989,642 | 6/1961 | Svel | 250—231 X |
| 3,128,386 | 4/1964 | Hughes | 250—279 X |
| 3,204,236 | 8/1965 | Duris et al. | 200—211 X |
| 3,247,435 | 4/1966 | Baumhart et al. | 200—8 |
| 3,290,506 | 12/1966 | Bertram | 250—233 X |

WALTER STOLWEIN, Primary Examiner

U.S. Cl. X.R.

250—229; 337—102